US010505807B2

(12) United States Patent
Sanneck et al.

(10) Patent No.: US 10,505,807 B2
(45) Date of Patent: *Dec. 10, 2019

(54) NETWORK COORDINATION APPARATUS

(71) Applicant: NOKIA SOLUTIONS AND NETWORKS OY, Espoo (FI)

(72) Inventors: Henning Sanneck, Munich (DE); Tobias Bandh, Reutlingen (DE); Raphael Romeikat, Augsburg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 97 days.

This patent is subject to a terminal disclaimer.

(21) Appl. No.: 15/711,315

(22) Filed: Sep. 21, 2017

(65) Prior Publication Data

US 2018/0034699 A1 Feb. 1, 2018

Related U.S. Application Data

(63) Continuation of application No. 14/358,933, filed as application No. PCT/EP2011/070230 on Nov. 16, 2011, now Pat. No. 9,893,943.

(51) Int. Cl.
*H04L 12/24* (2006.01)
*H04W 84/12* (2009.01)
*H04W 84/18* (2009.01)

(52) U.S. Cl.
CPC ...... *H04L 41/0886* (2013.01); *H04L 41/0816* (2013.01); *H04L 41/0873* (2013.01); *H04W 84/12* (2013.01); *H04W 84/18* (2013.01)

(58) Field of Classification Search
CPC ............. H04L 41/0886; H04L 41/0816; H04L 41/0873; H04W 84/12; H04W 84/18

USPC .......................................................... 370/255
See application file for complete search history.

(56) References Cited

U.S. PATENT DOCUMENTS

| 2010/0232318 | A1 | 9/2010 | Sarkar |
| 2011/0051684 | A1 | 3/2011 | Li et al. |
| 2011/0086636 | A1* | 4/2011 | Lin ............ H04W 24/02 455/434 |
| 2011/0151886 | A1 | 6/2011 | Grayson et al. |

(Continued)

FOREIGN PATENT DOCUMENTS

| CN | 101854633 A | 10/2010 |
| CN | 102056336 A | 5/2011 |
| WO | 2010105575 A1 | 9/2010 |

OTHER PUBLICATIONS

Furqan Ahmed et al., "Distributed Graph Coloring for Self-Organization in LTRE Net works", Journal of Electrical and Computer Engineering; vol. 2010, 10 pages. (Copy submitted in parent U.S. Appl. No. 14/358,933).

(Continued)

*Primary Examiner* — Faisal Choudhury
(74) *Attorney, Agent, or Firm* — Squire Patton Boggs (US) LLP

(57) ABSTRACT

A method comprising determining at least one event criteria from a received event function request; determining an event impact from the at least one event criteria and a general function impact; determining whether the event impact interferes with at least one implemented function instance; and generating a coordination output based on the determination whether the event impact interferes.

20 Claims, 9 Drawing Sheets

(56) References Cited

U.S. PATENT DOCUMENTS

| | | | | |
|---|---|---|---|---|
| 2011/0179153 | A1* | 7/2011 | Masputra | G06F 1/3203 709/223 |
| 2011/0261721 | A1* | 10/2011 | Zhou | H04W 16/32 370/254 |
| 2012/0059923 | A1* | 3/2012 | Cleary | H04L 41/0233 709/223 |
| 2012/0066377 | A1 | 3/2012 | Li et al. | |
| 2013/0094404 | A1* | 4/2013 | Van Wyk | H04L 45/48 370/256 |
| 2013/0109421 | A1* | 5/2013 | Guey | H04W 24/02 455/507 |
| 2014/0066074 | A1 | 3/2014 | Folks et al. | |
| 2014/0233391 | A1 | 8/2014 | Reider et al. | |
| 2015/0351094 | A1* | 12/2015 | Zuniga | H04W 24/02 370/336 |

OTHER PUBLICATIONS

Thomas Kumer et al., "Final Report on Self-Organisation and its Implications in Wireless Access Networks", Deliverable D5.9; INFSO-ICT-216284 SOCRATES; Version 1.0, 135 pages, SOCRATES 2011. (Copy submitted in parent U.S. Appl. No. 14/358,933).

Tobias Bandh et al., "Graph Coloring Based Physical-Cell-ID Assignment for LTE Networks", 5th International Wireless Communications and Mobile Computing Conference; pp. 116-120; 2009. (Copy submitted in parent U.S. Appl. No. 14/358,933).

Seppo Hamalainen et al., "LTE Self-Organisation Networks (SON)—Network Management Automation for Operational Efficiency", Wiley 2012; ISBN 978-1-119-97067-5; 43 pages. (Copy submitted in parent U.S. Appl. No. 14/358,933).

Mehdi Amirijoo et al., "Neighbor Cell Relation List and Physical Cell Identity Self-Organization in LTE", IEEE International Conference on Communications Workshops; pp. 37-41; IEEE 2008. (Copy submitted in parent U.S. Appl. No. 14/358,933).

Frank Lehser, "NGMN Use Cases related to Self Organisation Network, Overall Description", NGMN Technical Working Group; Dec. 2008; 18 pages. (Copy submitted in parent U.S. Appl. No. 14/358,933).

Tobias Bandh et al., "Optimized Network Configuration Parameter Assignment Based on Graph Coloring", IEEE/IFIP Network Operations and Management Symposium; 2010 IEEE; pp. 40-47. (Copy submitted in parent U.S. Appl. No. 14/358,933).

Ulrich Barth et al., "Self-Organization in 4G Mobile Networks: Motivations and Vision", 7th International Symposium on Wireless Communication Systems (ISWCS); IEEE 2010; pp. 731-735. (Copy submitted in parent U.S. Appl. No. 14/358,933).

Henning Sanneck et al., "Transaction-based Configuration Management for Mobile Networks", 1st Annual Workshop on Distributed Autonomous Network Management System, Dublin, Jun. 2006, 8 pages. (Copy submitted in parent U.S. Appl. No. 14/358,933).

Chinese Office Action Application No. 201180076258.4, dated Jul. 27, 2016. (Copy submitted in parent U.S. Appl. No. 14/358,933).

Lars Christoph Schmelz et al., "A coordination framework for self-organisation in LTE Networks", Integrated Network Management (IM), 2011 IFIP/IEEE International Symposium on, IEEE, May 23, 2011, pp. 193-200, XP032035479. (Copy submitted in parent U.S. Appl. No. 14/358,933).

Tobias Bandh et al., "Policy-based coordination and management of SON functions", Integrated Network Management (IM), 2011 IFIP/IEEE International Symposium on, IEEE, May 23, 2011, pp. 827-840 XP032035329. (Copy submitted in parent U.S. Appl. No. 14/358,933).

Tobias Bandh et al., "Policy-based coordination and management of SON functions", Internet Citation, Oct. 6, 2010, pp. 1-12, XP 002625806. (Copy submitted in parent U.S. Appl. No. 14/358,933).

S5-113659; Nokia Siemens Networks; SON coordination: Conflicts and their categorization, 3GPP TSG SA WG5 (Telecom Management) Meeting #80; Nov. 2011; San Francisco, USA. (Copy submitted in parent U.S. Appl. No. 14/358,933).

S5-113167; Huawei; "Adding definition of SON coordination", 3GPP TSG SA WG5 (Telecom Management) Meeting #179; Oct. 10-14, 2011, Nanjing China. (Copy submitted in parent U.S. Appl. No. 14/358,933).

International Search Report Application No. PCT/EP2011/070230 dated Sep. 10, 2010. (Copy submitted in parent U.S. Appl. No. 14/358,933).

\* cited by examiner

Confused PCI
Assigment

Confusion-free PCI
Assigment

NETWORK COORDINATION APPARATUS

CROSS REFERENCE TO RELATED APPLICATION

This application is a Continuation of co-pending U.S. patent application Ser. No. 14/358,933, filed on Sep. 11, 2014, which is the National Stage Application based on PCT International Application No. PCT/EP2011/070230, filed on Nov. 16, 2011. The entire disclosures of these earlier applications are hereby incorporated herein by reference.

FIELD OF APPLICATION

The invention relates to network coordination apparatus configured to configure one or more network entities, but not exclusively limited to configuring one or more network entities within an automated self organising network.

BACKGROUND OF APPLICATION

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. Examples of wireless systems include public land mobile networks (PLMN), satellite based communication systems and different wireless local networks, for example wireless local area networks (WLAN). In wireless systems a network element or network entity (NE) or access node is provided by a base station. The radio coverage area of a base station is known as a cell, and therefore the wireless systems are often referred to as cellular systems. In some systems, for example a 3GPP standard system, a base station access node is called Node B (NB) or an enhanced Node B (eNB).

A user can access the communication system by means of an appropriate communication device. A communication device of a user is often referred to as user equipment (UE). A communication device is provided with an appropriate signal receiving and transmitting arrangement for enabling communications with other parties. A communication device may be arranged to communicate, for example, data for carrying communications such as voice, electronic mail (email), text message, multimedia, for enabling internet access and so on. Users may thus be offered and provided numerous services via their communication devices. The communication connection can be provided by means of one or more data bearers.

In wireless systems a communication device provides a transceiver station that can communicate with the access node and/or another communications device. A communication device or user equipment may also be considered as being a part of a communication system. In certain applications, for example in ad-hoc networks, the communication system can be based on use of a plurality of user equipment capable of communicating with each other.

Network management is a complex task. Complexity arises on the one side from the number of network elements (NEs) that have to be deployed and managed, and on the other side from interdependencies between the configuration and the status of the deployed network elements in terms of performance, faults, etc. In a heterogeneous network the variety of deployed technologies and their proprietary operational paradigms are difficult to handle. The configuration, optimization and troubleshooting of the management of the network therefore requires high expertise and operational management workflows to be typically performed by human operators supported by software tools. However, such manual and semi-automated management is time-consuming, error-prone, and potentially unable to react quickly enough to network changes and thus expensive.

It has been a goal of network management designers to attempt to automate operation, administration and management (OAM) functions by the deployment of "Self Organizing Networks" (SON). While SON concepts are generically applicable, these focus of developments has been to Radio Access Networks (RAN) due to the large number of NE (base stations) distributed over large geographical areas (and thus the incurred cost to doing remote and on-site management activities). In particular, for the long term evolution (LTE) and long term evolution—advanced (LTE-A) radio access network (RAN) standards such as evolved universal mobile telecommunications system (UMTS) Terrestrial Radio Access Network (E-UTRAN), SON is considered a crucial building block, due to the anticipated high degree of distribution and heterogeneity. In other words in such networks there is expected to be a wide range of telecommunications standards being employed such as concurrent operation of 2G/3G/LTE/LTE-A network elements. Furthermore the LTE networks are believed to also be heterogeneous in structure, for example employing LTE multi-layer structures where there can be pico cells, micro cells, and macro cells all operating over the same geographical range.

Typically the SON is controlled by the application of SON functions which monitor, plan and enforce control over network elements. However because the execution of SON functions is individual and dynamic (i.e., not pre-planned), the application of SON function instances can have run-time interactions with other SON functions instances. A "negative interaction" is called a "conflict". Conflicts are generally to be avoided.

Embodiments of the invention aim to address one or several of the above issues.

STATEMENT OF APPLICATION

In accordance with an embodiment there is provided a method comprising: determining at least one event criteria from a received event function request; determining an event impact from the at least one event criteria and a general function impact; determining whether the event impact interferes with at least one implemented function instance; and generating a coordination output based on the determination whether the event impact inteferes.

Determining at least one event criteria may comprise determining at least one of: an event type; at least one parameter associated with an event type; an event area; and an event time.

The method may further comprising storing the at least one event criteria.

Determining an event impact may comprise: determining a general function impact based on at least a part of the at least one event criteria; and determining an event impact based on the general function impact and a further part of the at least one event criteria.

The event impact may comprise at least one of: an event impact area; an event impact time; an event impact safety area; and an event impact safety time.

Determining whether the event impact interferes with at least one implemented function instance may comprise: receiving at least one implemented function instance event impact; comparing the event impact with the at least one implemented function instance event impact; and determining whether the event impact interferes with the at least one implemented function instance based on the comparing the event impact with the at least one previously implemented function instance event impact.

Comparing the event impact with the at least one previously implemented function instance event impact may comprise: comparing the event impact area with the at least one implemented function instance event impact area to determine a spatial interference; and comparing the event impact time with the at least one implemented function instance event impact time to determine a temporal interference.

Determining whether the event impact interferes with implemented function instances may comprise determining a conflict where a spatial interference and temporal interference occur.

Generating a coordination output based on the determination whether the event impact interferes may comprise acknowledging the request event when an interference is not detected.

The method may further comprise executing the request event following acknowledgement of the request event.

Generating a co-ordination output may comprise: receiving a coordination rule set dependent on the request event when a interference is determined; and applying the rule set to the at least one event criteria from a received event function request to generate a coordination output.

The coordination output may comprise at least one of: a reject event request output; an acknowledge amended event request output; a terminate previous event request output; a trigger further function output; and a rollback earlier event request output.

The method may further comprise at least one of: updating the at least one implemented event and; the request event within a context store.

Updating the request event may comprise at least one of: inserting a implemented event instance dependent on the request event; starting a context removal timer for an inserted implemented event instance.

Updating the at least one implemented event may comprise at least one of: deleting a context removal timer dependent on the timer being exceeded; and deleting a implemented event instance.

According to a second aspect there is provided an apparatus comprising: means for determining at least one event criteria from a received event function request; means for determining an event impact from the at least one event criteria and a general function impact; determining whether the event impact interferes with at least one implemented function instance; and means for generating a coordination output based on the determination whether the event impact interferes.

The means for determining at least one event criteria may comprise means for determining at least one of: an event type; at least one parameter associated with an event type; an event area; and an event time.

The apparatus may further comprise means for storing the at least one event criteria.

The means for determining an event impact may comprise: means for determining a general function impact based on at least a part of the at least one event criteria; and means for determining an event impact based on the general function impact and a further part of the at least one event criteria.

The event impact may comprise at least one of: an event impact area; an event impact time; an event impact safety area; and an event impact safety time.

The means for determining whether the event impact interferes with at least one implemented function instance may comprise: means for receiving at least one implemented function instance event impact; means for comparing the event impact with the at least one implemented function instance event impact; and means for determining whether the event impact interferes with the at least one implemented function instance based on the comparing the event impact with the at least one previously implemented function instance event impact.

The means for comparing the event impact with the at least one previously implemented function instance event impact may comprise: means for comparing the event impact area with the at least one implemented function instance event impact area to determine a spatial interference; and means for comparing the event impact time with the at least one implemented function instance event impact time to determine a temporal interference.

The means for determining whether the event impact interferes with implemented function instances may comprise means for determining an interference where a spatial conflict and temporal interference occur.

The means for generating a coordination output based on the determination whether the event impact interferes may comprise means for acknowledging the request event when an interference is not detected.

The apparatus may further comprise means for executing the request event following acknowledgement of the request event.

The means for generating a coordination output may comprise: means for receiving a coordination rule set dependent on the request event when an interference is determined; and means for applying the rule set to the at least one event criteria from a received event function request to generate a coordination output.

The coordination output may comprise at least one of: a reject event request output; an acknowledge amended event request output; a terminate previous event request output; a trigger further function output; and a rollback earlier event request output.

The apparatus may further comprise means for updating within a context store at least one of: the at least one implemented event and; the request event.

The means for updating the request event may comprise at least one of: means for inserting a implemented event instance dependent on the request event; and means for starting a context removal timer for an inserted implemented event instance.

The means for updating the at least one implemented event may comprise at least one of: means for deleting a context removal timer dependent on the timer being exceeded; and means for deleting an implemented event instance.

According to a third aspect there is provided apparatus comprising at least one processor and at least one memory including computer code for one or more programs, the at least one memory and the computer code configured to with the at least one processor cause the apparatus to at least perform: determining at least one event criteria from a received event function request; determining an event impact from the at least one event criteria and a general function impact; determining whether the event impact interferes with at least one implemented function instance; and generating a coordination output based on the determination whether the event impact inteferes.

Determining at least one event criteria may cause the apparatus to determine at least one of: an event type; at least one parameter associated with an event type; an event area; and an event time.

The apparatus may be caused to perform storing the at least one event criteria.

Determining an event impact may cause the apparatus to perform: determining a general function impact based on at least a part of the at least one event criteria; and determining an event impact based on the general function impact and a further part of the at least one event criteria.

The event impact may comprise at least one of: an event impact area; an event impact time; an event impact safety area; and an event impact safety time.

Determining whether the event impact interferes with at least one implemented function instance may cause the apparatus to perform: receiving at least one implemented function instance event impact; comparing the event impact with the at least one implemented function instance event impact; and determining whether the event impact interferes with the at least one implemented function instance based on the comparing the event impact with the at least one previously implemented function instance event impact.

Comparing the event impact with the at least one previously implemented function instance event impact may cause the apparatus to perform: comparing the event impact area with the at least one implemented function instance event impact area to determine a spatial interference; and comparing the event impact time with the at least one implemented function instance event impact time to determine a temporal interference.

Determining whether the event impact interferes with implemented function instances may cause the apparatus to perform determining an interference where a spatial interference and temporal interference occur.

Generating a coordination output based on the determination whether the event impact interferes may cause the apparatus to perform acknowledging the request event when an interference is not detected.

The apparatus may be further caused to perform executing the request event following acknowledgement of the request event.

Generating a co-ordination output may cause the apparatus to perform: receiving a coordination rule set dependent on the request event when a interference is determined; and applying the rule set to the at least one event criteria from a received event function request to generate a coordination output.

The coordination output may comprise at least one of: a reject event request output; an acknowledge amended event request output; a terminate previous event request output; a trigger further function output; and a rollback earlier event request output.

The apparatus may be further caused to perform at least one of: updating the at least one implemented event and; the request event within a context store.

Updating the request event may cause the apparatus to perform at least one of: inserting a implemented event instance dependent on the request event; and starting a context removal timer for an inserted implemented event instance.

Updating the at least one implemented event may cause the apparatus to perform at least one of: deleting a context removal timer dependent on the timer being exceeded; and deleting a implemented event instance.

According to a fourth aspect there is provided an apparatus comprising: an event processor configured to determine at least one event criteria from a received event function request; an impact determiner configured to determine an event impact from the at least one event criteria and a general function impact; and a coordination determiner configured to determine whether the event impact interferes with at least one implemented function instance and generate a coordination output based on the determination whether the event impact interferes.

The event processor may be configured to determine at least one of: an event type; at least one parameter associated with an event type; an event area; and an event time.

The apparatus may further comprise a memory configured to store the at least one event criteria.

The impact determiner may comprise: a general impact determiner configured to determine a general function impact based on at least a part of the at least one event criteria; and an event impact determiner configured to determine an event impact based on the general function impact and a further part of the at least one event criteria.

The event impact may comprise at least one of: an event impact area; an event impact time; an event impact safety area; and an event impact safety time.

The coordination determiner may comprise: an input configured to receive at least one implemented function instance event impact; a comparator configured to compare the event impact with the at least one implemented function instance event impact; and an interference determiner configured to determine whether the event impact interferes with the at least one implemented function instance based on the comparing the event impact with the at least one previously implemented function instance event impact.

The comparator may comprise: an area comparator configured to compare the event impact area with the at least one implemented function instance event impact area to determine a spatial interference; and a time comparator configured to compare the event impact time with the at least one implemented function instance event impact time to determine a temporal interference.

The interference determiner may be configured to determiner where a spatial interference and temporal interference occur.

The coordination determiner may comprise an acknowledgement generator configured to acknowledge the request event when an interference is not detected.

The apparatus may further comprise a function executor configured to execute the request event following acknowledgement of the request event.

The coordination determiner may comprise: an input configured to receive a coordination rule set dependent on the request event when an interference is determined; and an arbiter configured to apply the rule set to the at least one event criteria from a received event function request to generate a coordination output.

The coordination output may comprise at least one of: a reject event request output; an acknowledge amended event request output; a terminate previous event request output; a trigger further function output; and a rollback earlier event request output.

The apparatus may further comprise a context determiner configured to update within a context store at least one of: the at least one implemented event and; the request event.

The context determiner may comprise at least one of: an inserter configured to insert an implemented event instance dependent on the request event; and a timer initiator configured to start a context removal timer for an inserted implemented event instance.

The context determiner may comprise at least one of: a timer remover configured to delete a context removal timer dependent on the timer being exceeded; and an instance remover configured to delete an implemented event instance.

According to a further aspect there can be provided a method comprising: determining at least one event criteria from a received event function request; determining an event impact from the at least one event criteria and a general function impact; determining whether the event impact interferes with at least one implemented function instance; and generating a coordination output based on the determination of event impact interference.

A computer program product stored on a medium may cause an apparatus to perform the method as discussed herein.

An electronic device may comprise apparatus as discussed herein.

A chipset may comprise apparatus as discussed herein.

Various other aspects and further embodiments are also described in the following detailed description and in the attached claims.

SUMMARY OF THE FIGURES

The invention will now be described in further detail, by way of example only, with reference to the following examples and accompanying drawings, in which.

DESCRIPTION OF SOME EMBODIMENTS OF THE APPLICATION

Figure 1:
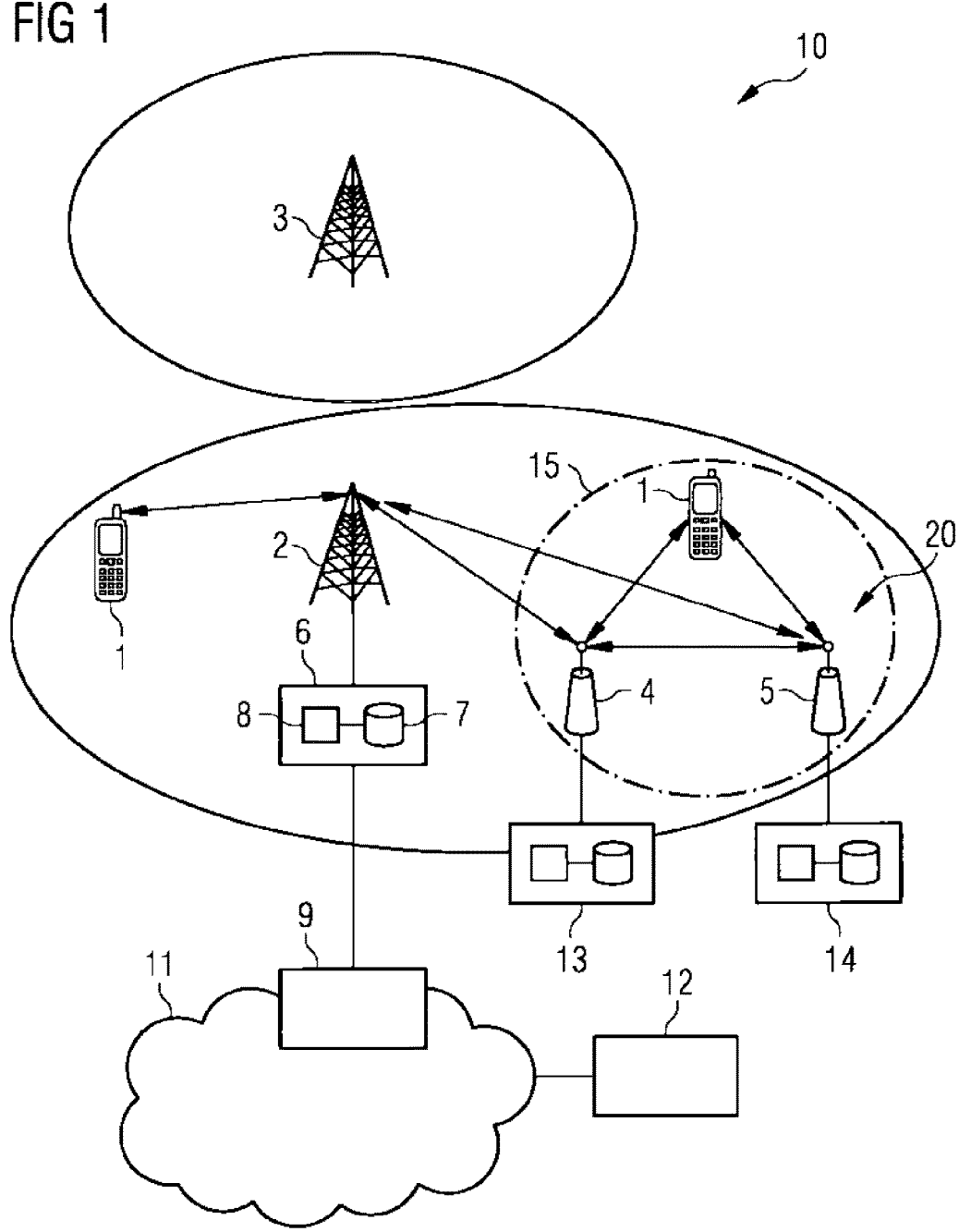
FIG. 1 shows a schematic representation of a network according to some embodiments.

In the following certain exemplifying embodiments are explained with reference to wireless or mobile communication systems serving mobile communication devices.

In particular the application describes a coordination function apparatus configured in some embodiments to provide a dynamic coordination operation required to determine any function or feature interactions or interference and in some embodiments to determine and avoid negative conflicts between self-organising network function instances. Interference, overlaps or interact are where one function instance or event (with an associated impact area & time) and another function or event (also with an associated impact area & time) produce (partial) overlaps in area & time. The embodiments of the application are configured to detect and react accordingly to the interference. As described herein the interference is usually a conflict because each function has its proper target. However in principle the detection and reaction to interference can be any suitable mechanism, for example, the embodiments of the application could detect the overlap and then trigger the start of a third or further function performing some network control in the overlap area.

Before explaining in detail the certain exemplifying embodiments, certain general principles of a wireless communication system and the nodes thereof are briefly explained with reference to FIGS. 1 and 2 to assist in understanding of the herein described embodiments.

In a communication system 10 a user can be provided with a mobile communication device 1 that can be used for accessing various services and/or applications. The access can be provided via an access interface between the mobile communication device 1 and an appropriate wireless access system of a communication system 10 comprising an access node. An access node or network entity (NE) can be provided by a base station. FIG. 1 shows part of a radio access network (RAN), including a base station 2. The term base station will be used in the following and is intended to include the use of any of these network access nodes or any other suitable network entity. The communication system 10 also comprises a self-organising network management entity (not shown). The self-organising network SON functions can be integrated into the OAM (Network Management) architecture and communicate with via the Itf-S: not standardized and Itf-N: standardized interfaces.

An appropriate mobile user device or station may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device is often called a user equipment (UE). Each mobile device 1 and base station 2 may have one or more radio channels open at the same time and may receive signals from more than one source.

Figure 2:
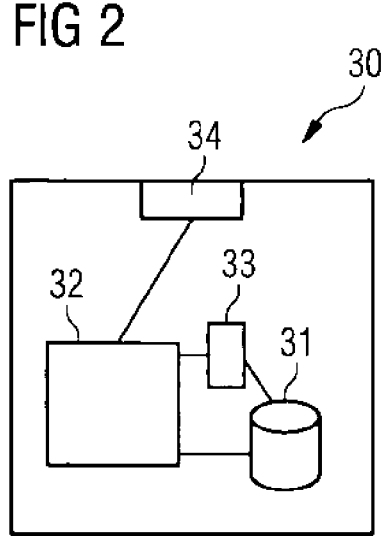
FIG. 2 shows a schematic representation of a control apparatus according to some embodiments.

FIG. 1 shows a base station 2 having a cell area associated therewith and the base station 2 is connected to relay nodes 4, 5. Each relay node can establish a connection to the base station 2 or alternatively the relay nodes can share the same backhaul link. In the cell area of the base station 2, there can be provided two relay nodes 4 and 5, but it is noted that this is by way of example only. In practice there may be more or less than two relay nodes. In relaying a relay node (RN) is wirelessly connected to the radio-access network via a donor cell, that is the cell of base station 2 of FIG. 1. FIG. 1 also shows neighbouring cells provided by another base station 3 which the relay nodes 4, 5 are not connected to.

Relay nodes may be used, for example, in block of flats and other buildings, offices, warehouses and/or factories and/or in public places, for example in shopping malls, sports or exhibition halls or arenas, particular areas of cities, on moving platforms such as trains, ships, busses, aeroplanes and so on.

The relay nodes 4, 5, can be relatively low power nodes that may be deployed to provide enhanced indoor coverage, additional capacity at hotspots or cell edge regions. For example, in the case of indoor deployment, such an access point or node may be provided for example in apartment blocks or office buildings and hence there may be a relatively high density of such access nodes.

Returning to FIG. 1, there is shown a gateway function 9 of the communication system 10 connecting a core network 11 and/or another network, application functions or services 12. A packet data network may also be provided by means of appropriate gateway nodes. Regardless of the gateway arrangement, a communication device 1 can be connected to an external data network, for example the internet via the relay nodes 4, 5 and/or the base stations 2, 3.

The base stations 2, 3 can be typically controlled by at least one appropriate controller apparatus 6. The relay nodes 4, 5 are also typically controlled by at least one appropriate controller apparatus 13, 14. Furthermore the operation of these controller apparatus can in some embodiments be controlled by the self-organising network management entity not shown.

Figure 3:
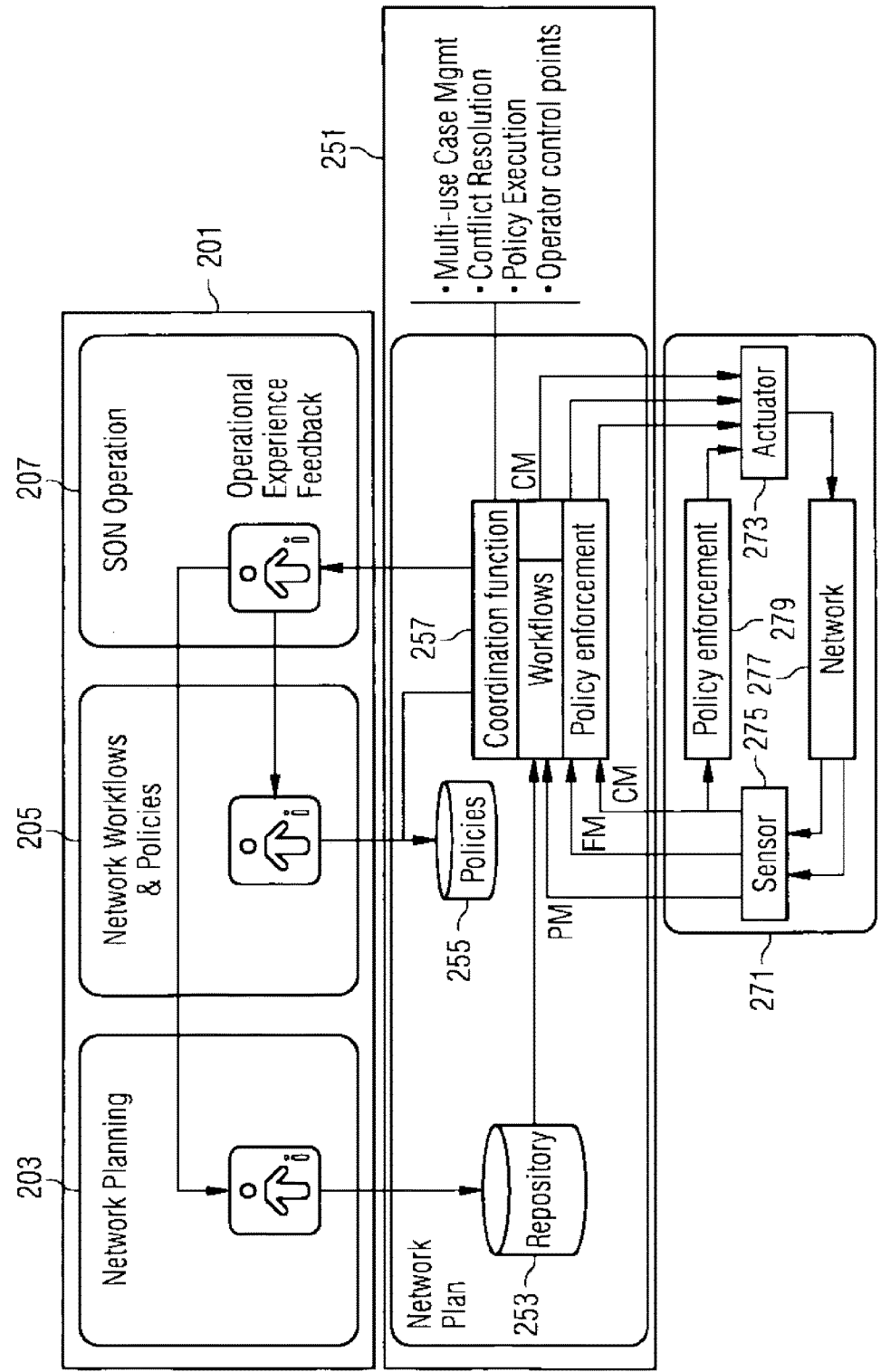
FIG. 3 shows an overview of the self-organising network according to some embodiments.

FIG. 3 shows an example self-organising network management controller apparatus for the network entities (relay nodes 4, 5 or the base stations 2, 3). The controller apparatus 6 is typically provided with at least one memory 31, at least one data processor 32 and an input/output interface 34 as shown in FIG. 3. The control apparatus 6 can further comprise a coordination function layer 33. The control apparatus 6 can be configured to execute appropriate software applications to provide the desired control functions. The control apparatus 6, can in some embodiments be provided in a node and comprising at least one memory and computer program code can be configured, with the at least one processor, to cause the node to communicate with other network entities to communicate control information. At least some of the processing blocks can in some embodiments be carried out by one or more processors in conjunction with one or more memories. The processing block may be provided by an integrated circuit or a chip set. The control apparatus can be interconnected with other control apparatuses.

A non-limiting example of mobile architectures where the herein described principles may be applied is known as the Evolved Universal Terrestrial Radio Access Network (E-UTRAN). Non-limiting examples of appropriate access nodes are a base station of such system, for example what is known as NodeB or eNB in the vocabulary of the 3GPP specifications. Other examples include base stations of systems that are based on technologies such as wireless local area network (WLAN) and/or WiMax (Worldwide Interoperability for Microwave Access). Access nodes can provide cellular system level base stations providing E-UTRAN features such as user plane Radio Link Control/Medium Access Control/Physical layer protocol (RLC/MAC/PHY) and control plane Radio Resource Control (RRC) protocol terminations towards mobile communication devices.

FIG. 3 shows a schematic overview of an example self-organising network management controller 251 or automated operation administration and management (OAM) function apparatus. With respect to the following examples the operation of the example self-organising network management controller focuses on the organisation of Radio Access Networks (RAN) and in particular for LTE and LTE-A RAN (E-UTRAN).

The self-organising network management controller 251 is shown operating under a pre-planned or network design layer 201 and operating on the network layer 277.

The network design layer 201 is shown comprising a network planning operator 203 configured to produce data detailing the network physical or geographical design and the network topological or logical design and pass this to the self-organising network management controller layer to be stored in the network plan repository 253.

Furthermore the network design layer 201 can comprise a network workflow and policy operator 205 configured to produce design data detailing the operation policies to be applied to the network by the self-organising network management controller layer and stored in a policies storage 255.

The network design layer 201 can furthermore comprises a self-organising network (SON) operator 207 configured to review at a design layer the operation of the self-organising network management controller and propose based on operational experience and feedback information with can be implement in the network workflow and policy operator 205 and the network planning operator 203 as well as being passed to the self-organising network management controller 251.

The self-organising network management controller in some embodiments comprises a repository 253 configured to receive the network information from the network planning operator 203 and configured to supply this information to the self-organising network management controller processor 257.

Furthermore in some embodiments the self-organising network management controller comprises a policy storage 255 configured to receive the policy information from the network workflow and policies operator 205 and further configured to supply the policies information to the self-organising network management controller processor 257.

The self-organising network management controller 251 in some embodiments comprises a self-organising network management controller processor 257 configured to receive network information from the repository 257, policy information from the policies storage 255 and furthermore receive network sensory information from the network layer 275. In some embodiments the coupling between the network layer 275 and the self-organising network management controller processor 257 are a performance management (PM) coupling providing/receiving PM information, a configuration management (CM) coupling providing/receiving CM information and a fault management (FM) coupling providing/receiving FM information. The data which is acquired in the path from the NE to the OAM system (KPIs, alarms, configuration status). In the path from the OAM system to the NE, CM data (updated configurations) is transmitted (based on analysis/decisions made on the PM/FM/CM data). The automation of this process (analysis, decision making) is the concept of SON.

The self-organising network management controller processor 257 can in some embodiments include a coordination function controller or processor, a workflow function controller or processor and a policy enforcement controller or processor.

The network layer 271 can in some embodiments comprise actuators configured to receive the CM, FM and PM information from the self-organising network management controller processor 257 and configured to control the network elements. In some embodiments the actuators 273 can be configured to receive a feedback coupling from a network layer policy enforcement processor 279.

The network layer 271 can furthermore in some embodiments comprise the network elements 277 which are configured by the actuators 273. Furthermore the network elements 277 can be configured to supply a sensor 275 with suitable CM, FM and PM information.

The network layer 271 in some embodiments comprise a sensor monitoring the CM, FM and PM information and supply at least part of this information to a policy enforcement processor within the self-organising network management controller processor and furthermore in some embodiments to a network layer policy enforcement processor 279.

The network layer 271 furthermore in some embodiments can comprise a network layer policy enforcement processor 279 configured to perform local feedback to the actuator 273.

In some embodiments self-organising network management controller processor can be configured to partition the self organisation tasks into the areas of configuration, optimization and healing.

Within each partition area is can be possible in some embodiments to define SON use cases. SON use cases can themselves be characterized by a trigger situation (in other words a pre-condition under which a control functionality is activated), the inputs to the use case (which may for example include the targeted network resource), the required steps to fulfil a use case, the output (for example the possible actions to be performed on the network resources), and the result (in other words the post-condition).

It would be understood that SON functions are in some embodiments the realization of the functionality required by a SON use case. Each SON function can in some embodiments be partitioned into a monitoring part, an algorithm part and, an action or execution part.

For example a monitoring part can be defined by a monitoring of measurements, key performance indicator (KPI) or events relevant to the use case or a trigger situation. In some examples the monitoring part defines a detector functionality for the trigger situation. In some embodiments the monitoring part can be continuously active, scheduled at certain times/time intervals or be triggered on-demand (for example by a human operator).

The algorithm part furthermore in some embodiments can be defined by the acquisition of input data (in addition to monitoring data), an evaluation of network state and context, and a computation of new configurations and whether/when trigger additional tasks/functions are to be performed.

The action part is in some embodiments defined as the enforcement of the algorithm part results.

The SON functions have a generic function area which in some embodiments can be associated with the function. The function area comprises all network resources, and in particular the cells as discussed herein, which have to be manipulated by a SON function to achieve the desired goal. These resources can be defined both in terms of geographical area (where for example the network resources are a set of cells) and/or in terms of topological area (where for example the network resources are a set of router interfaces).

The SON function instances can in some embodiments be defined as the run-time instantiation of a (specific part of a) SON function. They can be understood to act on network resources in a certain area at a certain time. Thus while the "function area" discussed herein is generic (in other words implies that a function works, e.g., on a pair of two adjacent cells). The function instance area, however, is a concrete instantiation of the function (for the example introduced above, a specific pair of cells with IDs X and Y being adjacent to each other).

It would be understood that the SON function instances have a spatial scope (e.g., set of cells, set of network interfaces) and temporal scope (activity in certain time intervals). Furthermore a SON function instance may get active at any time (e.g., triggered by a network measurement crossing a threshold) without any involvement by a human operator or a conventional OAM function. Thus SON function instances can be considered to run or operate "inside" the OAM system and/or the NE.

This therefore is different from traditional network operation and optimization where data of an entire network domain is "aligned" to the OAM system and then modified (optimized) within a single offline function. When new NE configurations have been computed, they are "rolled out" in the next step. The execution of this alignment/rollout cycle is scheduled/planned and supported by a human operator.

The execution of SON functions can furthermore be considered to be individual and dynamic (in other words not pre-planned and rolled out), however as discussed herein SON function instances can have run-time interactions with each other. A "negative interaction" is called a "conflict".

Although it is possible to run the SON functions in a fully serialized manner (executing SON functions one after each other for an entire network domain) it would be understood that this is not feasible because it would severely limit the efficiency of the automated OAM system. In some embodiments the co-ordination function processor can be configured to address the tradeoff between safety (avoiding basically all conflicts) vs. efficiency (fast, parallelized execution of SON function instances).

The application according to some embodiments introduces a run-time "coordination layer" in the system where all events relevant to coordination are processed and thus a dynamic locking scheme can be enforced.

Figure 4:
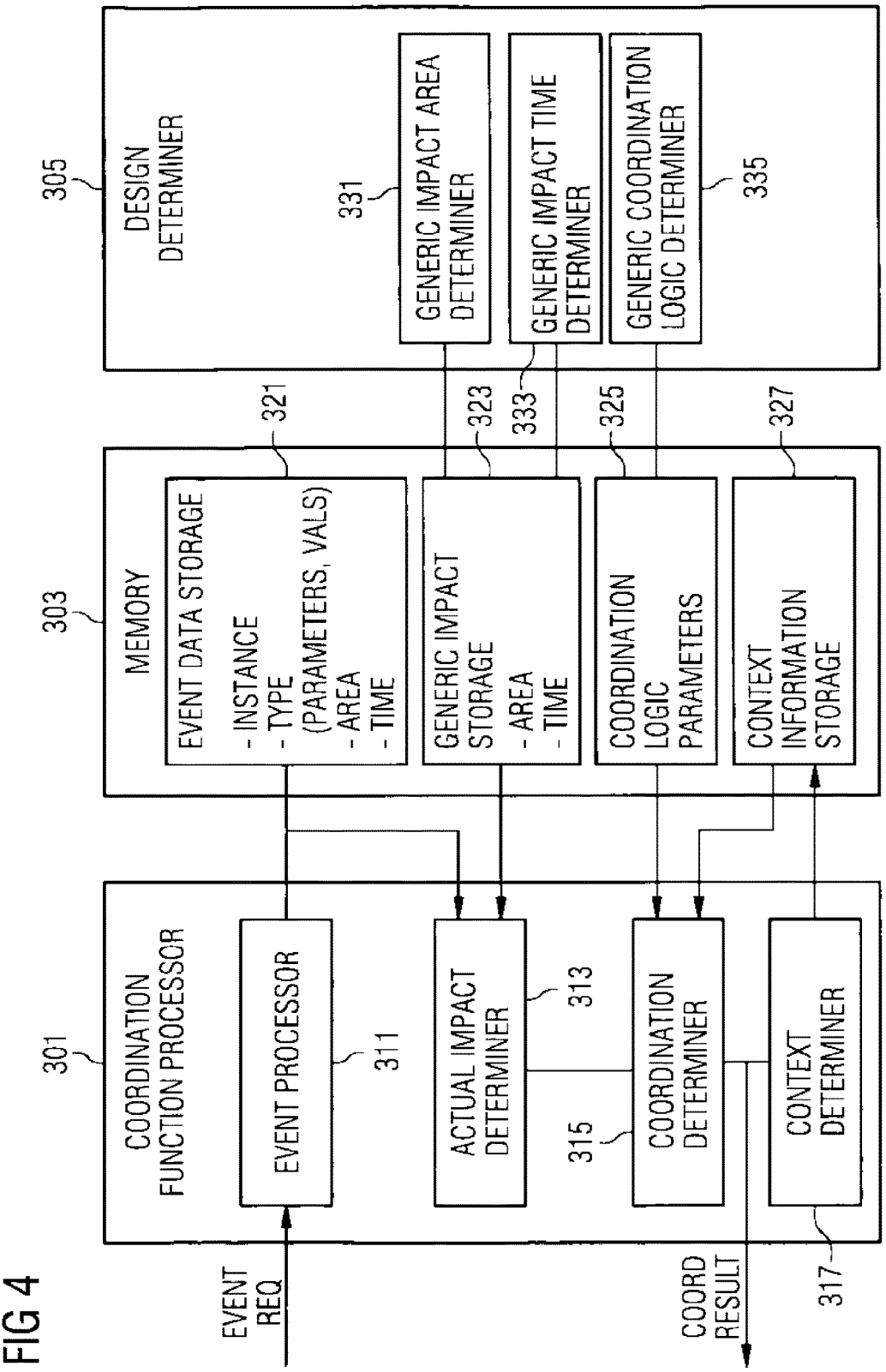
FIG. 4 shows a schematic representation of coordination function layer implementing apparatus according to some embodiments.

With respect to FIG. 4 the coordination function layer implementing apparatus is shown.

The coordination function layer implementing apparatus can in some embodiments comprise a design determiner 305. The design determiner in some embodiments can be implemented as part of the network design layer 201 and can be configured to determine for at least one of the SON functions the following set of information in the following determiner or processor elements. The "design determiner" can in some embodiments be implemented in a semi-automatic form. In other words there can in some embodiments be some human involvement required. Fully automating the whole design layer 201 in some embodiments requires an implementation with a learning capability capable of learning from experience.

In some embodiments the design determiner 305 comprises a generic coordination logic determiner 335. The generic coordination logic determiner 335 is configured to determine for a SON function any suitable coordination logic. In other words in some embodiments the generic coordination logic determiner 335 is configured to determine rules which express the conflict avoidance strategy which is desired by the network operator with respect to the function. These rules can for example be always giving a certain type of function priority over an active function of another type.

The generic coordination logic for the SON function can in some embodiments be stored in a memory 303 and in some embodiments in a coordination logic parameter part 325 of a memory 303 for later use by a coordination function processor 301.

In some embodiments the design determiner 305 comprises a generic impact area determiner 331. The generic impact area determiner 331 is configured to determine for a SON function any suitable impact area information. For example the impact area of a SON function can include the function area and in addition the network resources on which the function has impact on. In other words the impact area determiner 305 can be configured to determine where the SON function changes configurations within its function area and where these changes may impact other resources of the impact area which can be typically resources geographically or topologically adjacent to the function area.

The generic impact area information for the SON function can in some embodiments be stored in a memory 303 and in some embodiments in a generic impact storage part 323 of a memory 303 for later use by a coordination function processor 301.

In some embodiments the design determiner 305 comprises a generic impact time determiner 333. The generic impact time determiner 333 is configured to determine for a SON function any suitable impact time information. For example the impact time of a SON function can include the "temporal scope" of a SON function. In some embodiments the impact-time is defined for pairs of the function type and each potentially conflicting function type.

The generic impact time information for the SON function can in some embodiments be stored in a memory 303 and in some embodiments in a generic impact storage part 323 of a memory 303 for later use by a coordination function processor 301.

The design-time procedures to derive generic impact area and time and the coordination logic from the SON use case descriptions are generally understood and not described further with respect to the application.

Figure 5:
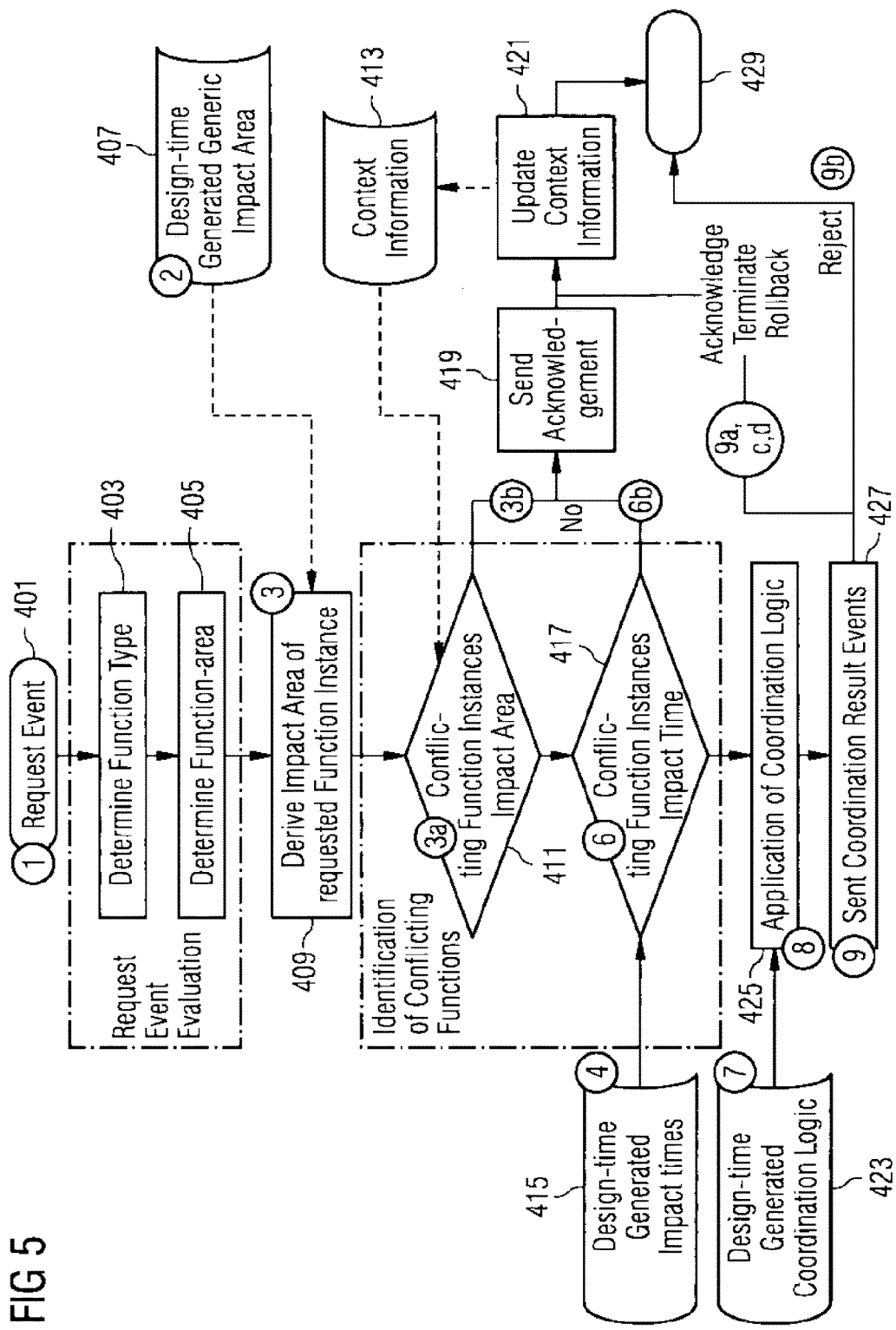
FIG. 5 shows a flow diagram of the operation of the coordination function layer implementing apparatus according to some embodiments.

In some embodiments the coordination function layer implementing apparatus can comprise a memory 303. The memory can be configured to store suitable information for use by the coordination function processor as shown in FIG. 4 and the operation of which is shown in FIG. 5. For example in some embodiments the memory 303 comprises a generic impact storage 323 configured to store for each SON function the generic impact area and time information. Furthermore in some embodiments the memory can include a coordination logic parameter part 325 configured to store generic coordination logic information for each SON function. In some embodiments the memory further comprises event data storage 321. The event data storage 321 is configured to store information related to each event received by the coordination function processor 311, such as instance, type, area, and time.

In some embodiments the coordination function layer implementing apparatus comprises a coordination function processor 301. The coordination function processor is configured to provide the dynamic coordination operation required determine any function or feature interactions and in some embodiments to determiner and avoid negative conflicts. The coordination function layer can furthermore in some embodiments enforce any type of operator policy, for example, temporarily suspend the execution of function instance of a certain type.

The coordination function processor 301 in some embodiments comprise an event processor 311. The event processor 311 is configured to receive event requests. In some embodiments the event processor 311 is configured to receive events primarily from the SON function instances for the following: event requests from a monitoring part that requests algorithm execution; event request from an algorithm part which requests action execution; and additional events requests from the human operator, OAM functions, network elements.

The operation of receiving the event request is shown in FIG. 5 by step 401.

The event processor 311 is configured in some embodiments to extract from the request any suitable or relevant information. For example in some embodiments the event processor is configured to extract at least the information of the requesting function instance (type of function, monitoring/algorithm part), request type (execution of algorithm/action part), for action part request type: action parameters (parameter values, etc.), requested function area, and request time.

The event processor 311 can in some embodiments store the extracted information in the memory 303 and in some embodiments the event data storage part 321.

The operation of request event evaluation is shown in FIG. 5 by the operation of the determination of the function type shown in FIG. 5 by step 403 and the operation of the determination of the function area shown in FIG. 5 by step 405.

In some embodiments the coordination function processor 301 comprises an actual event determiner 313. The actual event determiner 313 is configured for each event request to looks up or receive the defined generic impact area for the type of function from the memory 303 (generic impact storage 323).

The operation of receiving or reading the generic impact area for the type of function is shown in FIG. 5 by step 407.

Furthermore the actual event determiner 313 can be configured to determine the actual impact area from the generic impact area and the actual network resources. In some embodiments the actual event determiner 313 can be configured to receive or look up the actual network resources relating to the event request area instance and combine this information with the generic impact area to determine the actual impact area. In other words the coordination layer can be configured to combine the defined generic impact area information with the actual function area and thus derives the request's actual impact area with respect to actual network resources.

This actual impact area determination can in some embodiments be passed to a coordination determiner for further processing.

Figure 6:
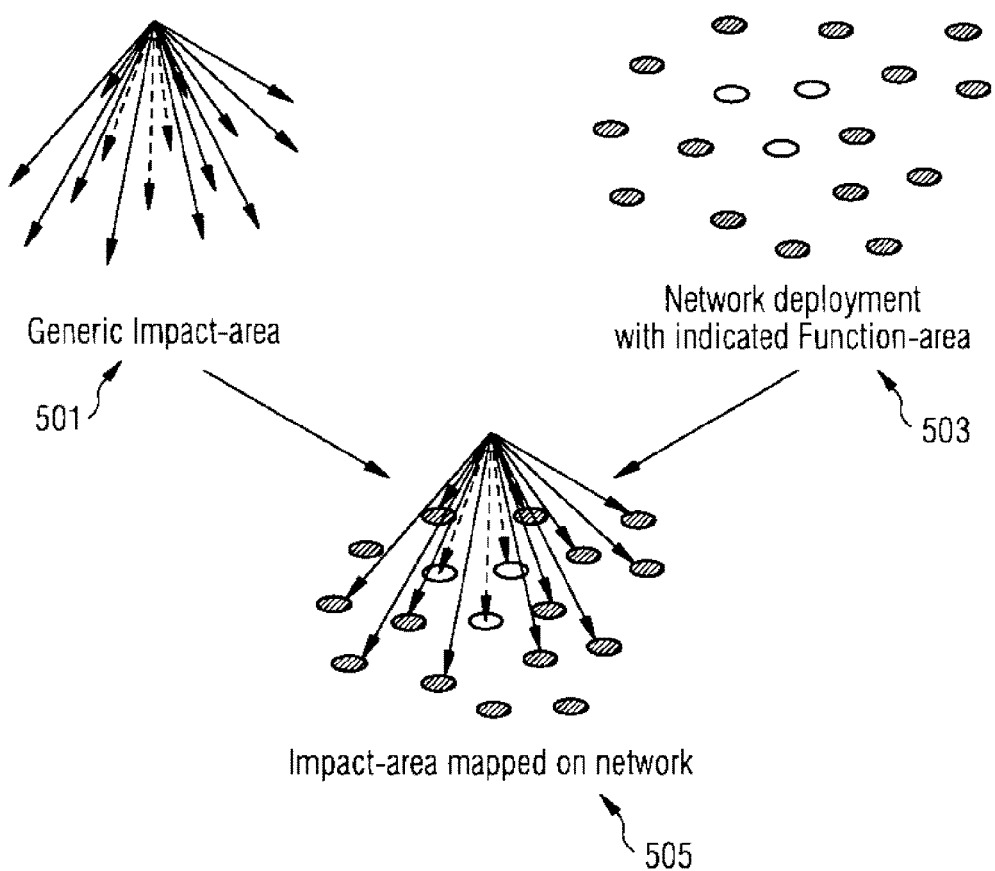
FIG. 6 shows a schematic representation of the operation of the impact determiner as shown in FIG. 4.

The operation of combining the event request instance and the generic impact information to generate an actual impact area is shown in FIG. 6, wherein the generic impact area map 501 can be applied to the network deployment with the indicated function instance area 503 to create the impact area mapped on the network.

The operation of determining the actual impact area is shown in FIG. 5 by step 409.

In some embodiments the coordination function processor 301 further comprises a coordination determiner 315 configured to identify potentially conflicting function instances based on the actual impact area using the stored data from previously received events. In some embodiments the previously stored events can be received or looked up from a context information memory or store 327 which in some embodiments is part of the memory 303 and the stored request data.

The reading or receiving of context information is shown in FIG. 5 by step 413.

The operation to identify potentially conflicting function instances based on the actual impact area using the stored data from previously received events is shown in FIG. 5 by step 411.

Where the coordination determiner 315 determines there are no potentially conflicting functions with overlapping impact areas then the coordination determiner 315 can be configured to acknowledge the request and forwarded the request to be executed.

The operation of acknowledgement of the request is shown in FIG. 5 by step 419.

Furthermore following the acknowledgement a context update can be performed by the context determiner 317.

Where the coordination determiner 315 determines that there is a potential conflict then in some embodiments the coordination determiner 315 is further configured receive the design time generated impact times with respect to the event request instance.

In some embodiments the coordination determiner 315 having looked up the generic impact times for each potentially conflicting function type and the requested function type from its persistent data store, combine the defined generic impact times information with the actual request time and thus determine the request's set of actual impact times with respect to the actual network resources.

Furthermore the coordination determiner 315 can in some embodiments be configured to compare the request's actual impact times and the impact times from other SON function instances stored in the context information storage in order to evaluate any potentially conflicting function instances with overlapping impact areas.

The operation to identify potentially conflicting function instances overlapping in time is shown in FIG. 5 by step 417.

Where the coordination determiner 315 determines there are no potentially conflicting functions with overlapping impact areas at the same time then the coordination determiner 315 can be configured to acknowledge the request and forwarded the request to be executed.

The operation of acknowledgement of the request is shown in FIG. 5 by step 419.

Where there is a relevant overlap in time the coordination determiner is further configured to determine a suitable coordination action.

The coordination determiner can therefore in some embodiments be configured to look up or receive the coordination logic for the requesting function type from the persistent data store, such as the coordination logic parameter part 325 of the memory 303.

The operation of receiving the coordination logic for the requesting function type is shown in FIG. 5 by step 423.

The coordination layer applies the coordination logic resulting in a coordination result.

The operation of the application of the coordination logic is shown in FIG. 5 by step 425.

The coordination result can be for example an acknowledge result, a reject request result, or a terminate/rollback earlier request result.

The coordination result can then be sent to be further processed or processed within the coordination layer.

The operation of sending the coordination result is shown in FIG. 5 by step 427.

Figure 9:
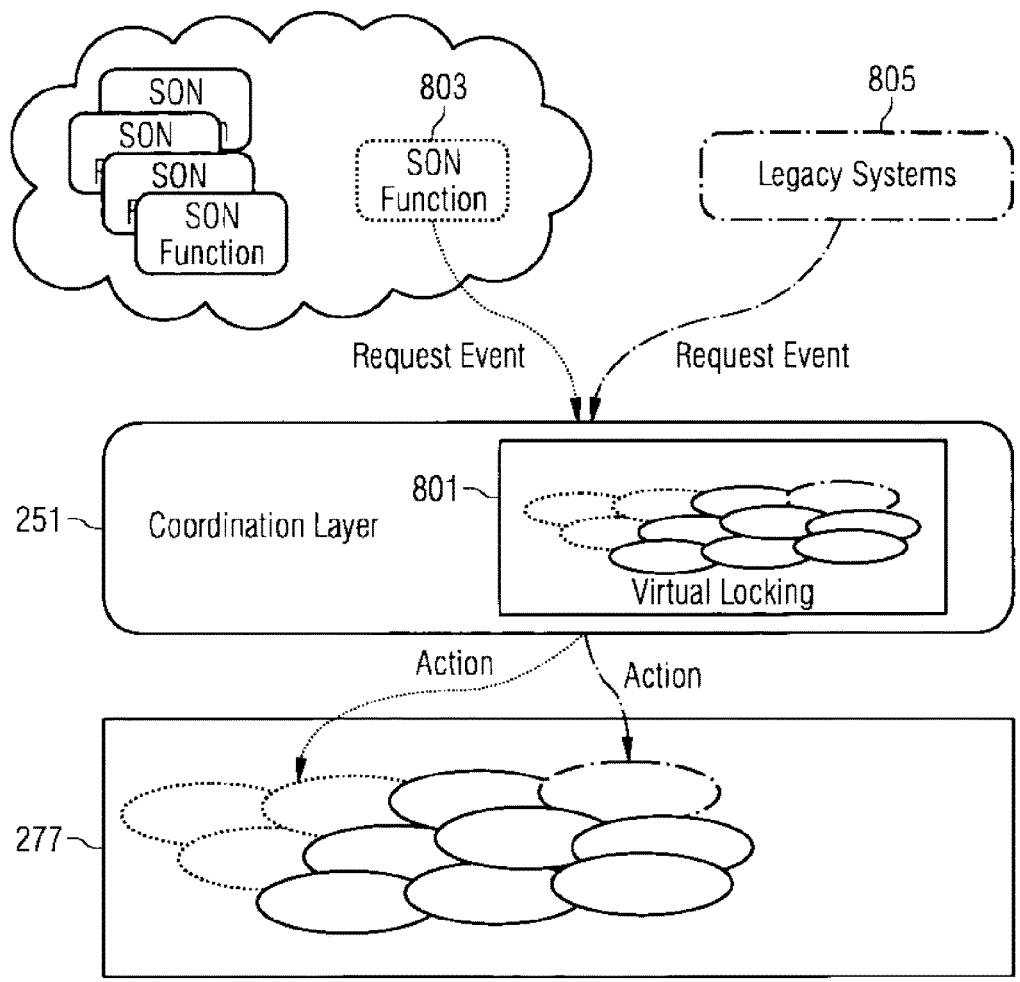
FIG. 9 shows schematically the concept of virtual locking as implemented in some embodiments of the application.

A coordination result can in some embodiments trigger some further coordination-layer-level processing of the request. For example in some embodiments the coordination-layer-level processing of the request can include changing action parameters of the request and amending the request instance stored in the event data storage 321 part of the memory In some embodiments the respective coordination result can be enforced using dynamic, virtual locks. The virtual lock or locking is implemented by not locking at the physical resource level, but at the levels "above" where all the required information for many physical resources are stored and can thus avoid problems like deadlocks when locking at the physical resource level. This concept can for example be shown in FIG. 9 wherein the coordination layer 251 receives SON function request events 803 and legacy request events 805. The coordination layer 251 can implant a virtual locking operation in that all change requests, such as the SON function request events and legacy request events 805 pass through the coordination layer which implements the virtual locking 801 by action controlling the network layer 277. Hence in such embodiments as described herein it is not necessary to perform locking at the physical resource level.

The coordination result of Acknowledge (ACK) can in some embodiments include the context information on the network resources within the impact area of the requested function being updated with the request and impact time information, thereby creating a dynamic, virtual lock. The request can furthermore in some embodiments be executed on the network. In some embodiments the coordination layer or the requesting function can be configured to trigger the actual execution however the execution of SON functions is known and not described in detail herein.

The coordination result of Terminate (TRM) can in some embodiments cause the conflicting function instance to be terminated. The context information about this function instance is deleted in the update context information operation described herein.

The coordination result of Rollback (RB) can in some embodiments cause the actions performed by the previous function instance (which are stored in the context information memory) are undone and the context information about this function is deleted in the update context information operation described herein.

The coordination result of Reject can in some embodiment cause the request information to be deleted and the event is not forwarded. In other words the request is reacting to another function instance's dynamic, virtual lock.

In some embodiments the coordination function processor 301 comprises a context determiner 317 configured to perform an update context information operation dependent on the current request coordination processing.

Figure 7:
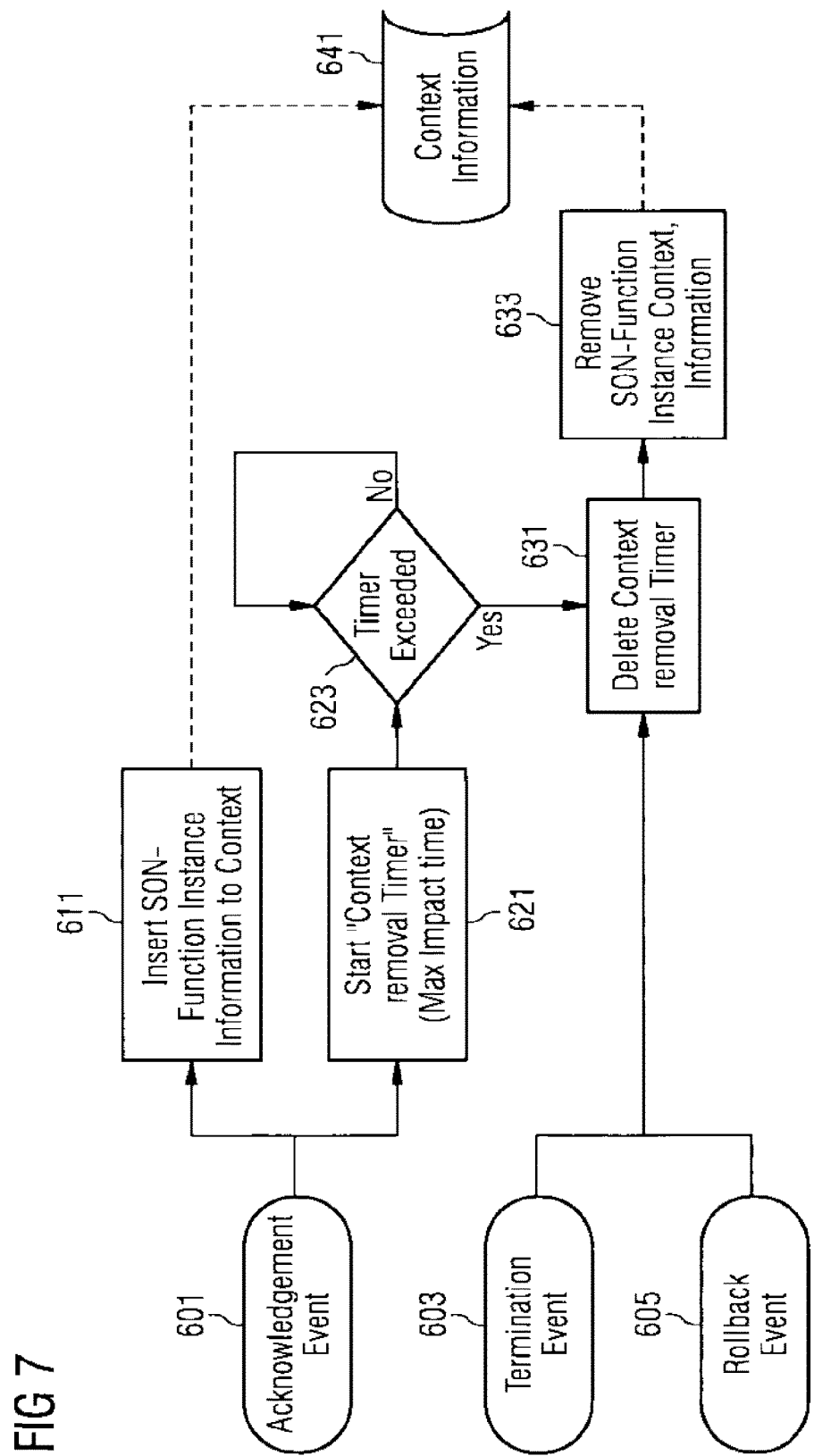
FIG. 7 shows a flow diagram of the operation of the context determiner according to some embodiments.

The operation of the context determiner 317 is shown with respect to FIG. 7.

The context determiner 317 is in some embodiments configured to receive an acknowledgement coordination result.

The operation of receiving an acknowledgement coordination result is shown in FIG. 7 by step 601.

The context determiner on receiving an acknowledgement coordination result is configured in some embodiments to generate a SON function instance information value for insertion to the context memory.

The operation of generation of SON function instance information value for insertion is shown in FIG. 7 by step 611.

Furthermore the amendment of the context information store is shown in FIG. 7 by step 641.

Furthermore the context determiner 317 on receiving an acknowledgement coordination result is configured in some embodiments to start a context removal timer defined with respect to the maximum impact time of the associated event request.

The operation of starting the context timer is shown in FIG. 7 by step 621.

Furthermore following the starting of the context timer the context determiner can be configured to perform a check on when the timer is exceeded and perform a delete context operation such as described herein with respect to the termination or rollback event coordination result processing when the check is met.

The operation of checking the timer is shown in FIG. 7 by step 623.

The context determiner 317 is in some embodiments configured to receive a termination result or a rollback event result.

The operation of receiving a termination coordination result is shown in FIG. 7 by step 603 and receiving a rollback coordination result in FIG. 7 by step 605.

Furthermore the context determiner 317 on receiving termination coordination result, or a rollback coordination result or a timer exceeded result is configured in some embodiments to delete the context/remove the timer.

The operation of deleting the context/removing the timer is shown with respect to FIG. 7 by step 631.

Furthermore following the deleting of the context/removing the timer the context determiner 317 in some embodiments can be configured to remove the SON function instance context information from the context information storage 327.

The operation of removing the SON function instance context information is shown in FIG. 7 by step 633.

In such embodiments therefore context information about executed SON-Functions is only stored until the longest impact time for this function has expired.

The context information can be considered in some embodiments to be about "active" SON function instances and previously executed SON function instances. The context is organized along the network resources and generated/maintained according to the actual impact area and impact times. The context is maintained with the help of timers. Upon timer expiry (or explicit deletion) the respective context information is deleted.

To illustrate an example of the operation of the coordination function layer instances of the Physical Cell ID (PCI) assignment SON Function is shown.

Figure 8A:
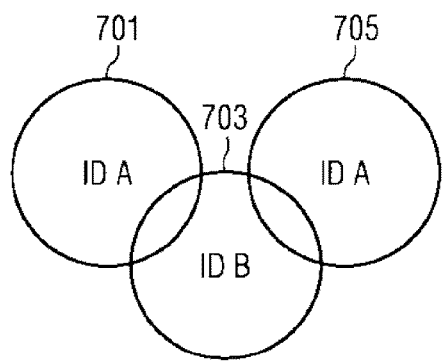
FIGS. 8A and 8B shows schematically an example of a conflict confused physical cell ID assignment and confusion-free physical cell, respectively.
Figure 8B:
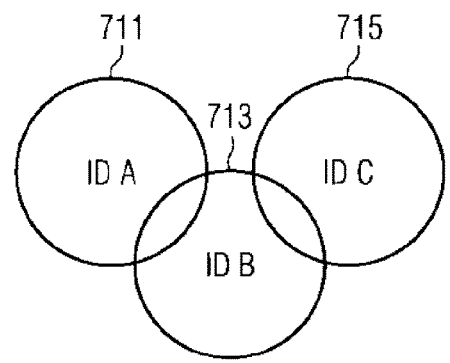

For the following example the constraints for the PCI assignment are that no "collisions" and "confusions" occur. A collision can be defined as two cells with overlapping coverage are assigned the same PCI (and are thus not distinguishable for UEs). Furthermore a confusion can be defined as a cell (ID B 703 in FIG. 8A) has at least two adjacent cells with overlapping coverage to itself which have the same PCI (ID A as shown in cells 701 and 703). A confusion free PCI assignment is shown with respect to FIG. 8B by the cell 713 (ID B) having overlapping coverage to itself having different PCI values shown by cell 711 (ID A) and cell 715 (ID C).

In traditional OAM, collision- and confusion-freeness have been the requirement for an algorithm assigning cell IDs for an entire network domain. In SON, incremental (i.e., dynamic) ID assignment for an individual cell is assumed where multiple PCI assignment SON function instances can be active at the same time in a network domain.

In the following example the generic impact area determiner 331 for the SON PCI function can determiner that the generic function area defined by a PCI assignment for a single cell is considered and therefore the function area is a single cell. Furthermore the generic impact area determiner 331 can determine that the impact area includes at least the first and second degree neighbouring cells (neighbours of neighbours of the cell). In some embodiments the impact area can be defined as a larger impact area, for example if confusion of the cell has to be resolved or if the neighborships are not precisely known. The subsequently required PCI assignment function instances could conflict with function instances that have been acknowledged on cells that were not covered anymore by the impact area of the initial PCI function instance. This can lead to situations where erroneous PCIs are assigned or the function instances block each other.

In some embodiments the generic impact area determiner 331 can furthermore under the input of the operator can extend the impact area via a generic safety margin area to higher degree neighbours (so the "extended or safety impact area" is the defined "generic impact area" plus the "safety margin area"). Thus in some embodiments there can be defined both an impact area and/or impact time which incorporates the safety factor. In some embodiments the actual impact area and/time always contains a safety factor. In some embodiments there may be defined an "impact area" and/or "impact time" which specifies that the area and/or time may contain the "actual" impact area and/or time and some "safety" area and/or time associated with the impact.

It would be understood that a smaller impact area allows the parallel execution of a larger number of PCI assignments. With an increasing safety margin area the number of possible parallel executions is reduced down to a single function instance when the safety margin area comprises the complete network domain. At the design time the function designer can for example define the required impact area for the PCI function, as for example third degree neighbours.

The generic coordination logic determiner in this example can be configured to determine coordination logic with respect to the PCI/PCI case (in other words when two instances of type PCI) are considered. An example coordination logic would be that a first instance appearing at the coordination layer gets priority over a second one appearing later.

The generic impact time determiner can be configured for this example to set the impact time to be the actual time required to configure a PCI on the NE (for example including the time required to "reboot" a cell). In some embodiments the impact time can also comprise a operator-set minimum time interval between two PCI changes.

When at run-time a 'first' PCI function instance execution request is received, the coordination layer and in some embodiments the event processor 331 identifies the target cell as the function area and the actual impact determiner 313 derives the impact area in relation to this cell. As this is the 'first' PCI function instance there are no conflicts and the coordination determiner 315 outputs an acknowledgement. This information together with the maximal impact time is stored within the context information by the context determiner 317 performing a context update operation. Furthermore the function instance can be executed.

When another PCI function instance execution request is received by the coordination layer the information provided in the request event by the event processor is used by the actual impact determiner 313 to derive the impact area.

The coordination determiner is then configured to evaluate the context information to determiner whether there are other potentially conflicting function instances with a shared impact area. If this is the case the new function execution request is treated according to the coordination logic (for example the other request is terminated).

It would be understood that the embodiments of the application allow a preferable safety vs. efficiency tradeoff which can be governed by adjusting impact area and impact time parameters (and for example provide a safety margin area such as shown in the above example).

Furthermore in some embodiments of the application only minimal limitations on SON function design are imposed, in that events which are related potentially to other function instances need to be exposed to the coordination layer (coordination and the associated knowledge resides separately in the coordination layer rather than in the individual functions). Therefore embodiments of the application can be applied to both centralized and distributed SON function instances as long as the request events are exposed to the coordination layer (for centralized functions in the form of local events, for distributed functions as events based on a network protocol). Furthermore it can be possible in some embodiments of the application to avoid deadlocks, race conditions, oscillations by implementing an active coordination of SON functions. Furthermore these embodiments permit flexible coordination by amendment of the coordination logic with a rule engine allowing the system at run-time to adapt. Thus in some embodiments the "design-time" is not strictly the time before the whole system goes into operation, but before new functionality based on a new/updated rule is put into operation.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more of any of the other embodiments previously discussed.

We claim:

1. An apparatus for self-organizing a telecommunications network, the apparatus comprising:
    at least one processor; and
    at least one memory including computer code for one or more programs,
    the at least one memory and the computer code configured, with the at least one processor, to cause the apparatus at least to
    determine at least one event criteria from a received event function request;
    determine an event impact from the at least one event criteria and a general function impact;
    determine whether the event impact interferes with at least one implemented function instance and generate a coordination output based on the determination whether the event impact interferes;
    receive at least one implemented function instance event impact;
    compare the event impact with the at least one implemented function instance event impact; and
    determine whether the event impact interferes with the at least one implemented function instance based on the comparing the event impact with the at least one previously implemented function instance event impact.

2. The apparatus as claimed in claim 1, wherein the at least one event criteria comprises at least one of:
    an event type;
    at least one parameter associated with an event type;
    an event area; and
    an event time.

3. The apparatus as claimed in claim 1, wherein the at least one memory and the computer code are further configured, with the at least one processor, to cause the apparatus at least to:
    determine the general function impact based on at least a part of the at least one event criteria; and
    determine an event impact based on the general function impact and a further part of the at least one event criteria.

4. The apparatus as claimed in claim 1, wherein the at least one memory and the computer code are further configured, with the at least one processor, to cause the apparatus at least to:
    compare the event impact area with the at least one implemented function instance event impact area to determine a spatial interference; and
    compare the event impact time with the at least one implemented function instance event impact time to determine a temporal interference.

5. The apparatus as claimed in claim 1, wherein the at least one memory and the computer code are further configured, with the at least one processor, to cause the apparatus at least to:

receive a coordination rule set dependent on the request event when an interference is determined; and apply the rule set to the at least one event criteria from a received event function request to generate a coordination output.

6. The apparatus as claimed in claim 1, wherein the at least one memory and the computer code are further configured, with the at least one processor, to cause the apparatus at least to:

update within a context store at least one of:

the at least one implemented event; and the request event.

7. The apparatus as claimed in claim 6, wherein the at least one memory and the computer code are further configured, with the at least one processor, to cause the apparatus to perform at least one of:

inserting a implemented event instance dependent on the request event; and starting a context removal timer for an inserted implemented event instance.

8. The apparatus as claimed in claim 6, wherein the at least one memory and the computer code are further configured, with the at least one processor, to cause the apparatus to perform at least one of:

deleting a context removal timer dependent on the timer being exceeded; and deleting an implemented event instance.

9. The apparatus as claimed in claim 1, wherein the at least one memory and the computer code are further configured, with the at least one processor, to cause the apparatus at least to acknowledge the request event when an interference is not detected.

10. A method, comprising:

determining at least one event criteria from a received event function request;

determining an event impact from the at least one event criteria and a general function impact;

determining whether the event impact interferes with at least one implemented function instance and generate a coordination output based on the determination whether the event impact interferes;

receiving at least one implemented function instance event impact;

comparing the event impact with the at least one implemented function instance event impact; and determining whether the event impact interferes with the at least one implemented function instance based on the comparing the event impact with the at least one previously implemented function instance event impact.

11. The method as claimed in claim 10, wherein the at least one event criteria comprises at least one of:

an event type;

at least one parameter associated with an event type;

an event area; and an event time.

12. The method as claimed in claim 10, further comprising:

determining a general function impact based on at least a part of the at least one event criteria; and determining an event impact based on the general function impact and a further part of the at least one event criteria.

13. The method as claimed in claim 10, further comprising:

comparing the event impact area with the at least one implemented function instance event impact area to determine a spatial interference; and comparing the event impact time with the at least one implemented function instance event impact time to determine a temporal interference.

14. The method as claimed in claim 10, further comprising:

receiving a coordination rule set dependent on the request event when an interference is determined; and applying the rule set to the at least one event criteria from a received event function request to generate a coordination output.

15. The method as claimed in claim 10, further comprising:

updating within a context store at least one of:

the at least one implemented event; and the request event.

16. The method as claimed in claim 15, further comprising at least one of:

inserting a implemented event instance dependent on the request event; and starting a context removal timer for an inserted implemented event instance.

17. The method as claimed in claim 15, further comprising at least one of:

deleting a context removal timer dependent on the timer being exceeded; and deleting an implemented event instance.

18. The method as claimed in claim 10, further comprising acknowledging the request event when an interference is not detected.

19. A non-transitory computer readable medium comprising program instructions stored thereon for performing at least the following:

determining at least one event criteria from a received event function request;

determining an event impact from the at least one event criteria and a general function impact;

determining whether the event impact interferes with at least one implemented function instance and generate a coordination output based on the determination whether the event impact interferes;

receiving at least one implemented function instance event impact;

comparing the event impact with the at least one implemented function instance event impact; and determining whether the event impact interferes with the at least one implemented function instance based on the comparing the event impact with the at least one previously implemented function instance event impact.

20. The non-transitory computer readable medium as claimed in claim 19, wherein the at least one event criteria comprises at least one of:

an event type;

at least one parameter associated with an event type;

an event area; and an event time.

* * * * *